US012151210B2

(12) United States Patent
Liu et al.

(10) Patent No.: US 12,151,210 B2
(45) Date of Patent: Nov. 26, 2024

(54) METHOD FOR CONTROLLING HOLLOW FIBER NANOFILTRATION MEMBRANE SYSTEM WITH CONTROLLABLE POWER CONSUMPTION

(71) Applicant: Greentech Environment Co., Ltd., Beijing (CN)

(72) Inventors: Mu Liu, Beijing (CN); Yingqiang Su, Beijing (CN); Zehua Li, Beijing (CN); Xikun Zhu, Beijing (CN); Kai Sun, Beijing (CN); Mengyuan Duan, Beijing (CN); Huiming Han, Beijing (CN); Liyan Zhang, Beijing (CN); Yashun Liu, Beijing (CN)

(73) Assignee: Greentech Environment Co., Ltd., Beijing (CN)

( * ) Notice: Subject to any disclaimer, the term of this patent is extended or adjusted under 35 U.S.C. 154(b) by 0 days.

(21) Appl. No.: 18/676,235

(22) Filed: May 28, 2024

(65) Prior Publication Data

US 2024/0307824 A1      Sep. 19, 2024

(30) Foreign Application Priority Data

Oct. 17, 2023   (CN) ......................... 202311337367.8

(51) Int. Cl.
   *B01D 61/02*     (2006.01)
   *B01D 61/12*     (2006.01)
   (Continued)

(52) U.S. Cl.
   CPC .......... *B01D 61/12* (2013.01); *B01D 61/027* (2013.01); *B01D 63/02* (2013.01); *B01D 65/02* (2013.01);
   (Continued)

(58) Field of Classification Search
   CPC ........ B01D 61/12; B01D 63/02; B01D 65/02; B01D 69/08; B01D 2313/701; C02F 2209/006
   See application file for complete search history.

(56) References Cited

U.S. PATENT DOCUMENTS

| 6,030,525 A | 2/2000 | Eimer et al. |
| 2007/0039888 A1 | 2/2007 | Ginzburg et al. |

(Continued)

FOREIGN PATENT DOCUMENTS

| CN | 101376084 A | 3/2009 |
| CN | 102964023 A | 3/2013 |

(Continued)

OTHER PUBLICATIONS

Lekov, Alex. "Opportunities for Energy Efficiency and Open Automated Demand Response in Wastewater Treatment Facilities in California—Phase I Report." (2009). (Year: 2009).*

*Primary Examiner* — Bradley R Spies

(57) ABSTRACT

A method for controlling a hollow fiber nanofiltration membrane system with controllable power consumption, including the following steps. A filtration flow rate is determined by the program control system according to preset working conditions and the electricity price and the inlet water temperature obtained by a first monitoring module when the hollow fiber nanofiltration membrane assembly is started to perform a filtration process. The inlet water pressure change and the permeability change are monitored and recorded by a second monitoring module during the filtration process. A flushing mode and a flushing intensity of the cleaning system are determined by the program control system according to the inlet water pressure change and the permeability change during the filtration when the filtration process is completed.

4 Claims, 2 Drawing Sheets

(51) Int. Cl.
   *B01D 63/02* (2006.01)
   *B01D 65/02* (2006.01)
   *B01D 69/08* (2006.01)
   *C02F 1/44* (2023.01)

(52) U.S. Cl.
   CPC .............. *B01D 69/08* (2013.01); *C02F 1/442* (2013.01); *B01D 2313/60* (2022.08); *B01D 2313/701* (2022.08); *B01D 2313/903* (2022.08); *B01D 2321/02* (2013.01); *B01D 2321/04* (2013.01); *B01D 2321/18* (2013.01); *C02F 2209/001* (2013.01); *C02F 2209/006* (2013.01); *C02F 2209/02* (2013.01); *C02F 2209/03* (2013.01); *C02F 2303/16* (2013.01)

(56) References Cited

U.S. PATENT DOCUMENTS

2007/0295650 A1* 12/2007 Yoneda ................ B01D 61/025
                                                                    210/97
2018/0193800 A1    7/2018 Kelada

FOREIGN PATENT DOCUMENTS

| CN | 105214500 A | 1/2016 |
| CN | 116425267 A | 7/2023 |
| JP | H093980 A | 1/1997 |
| JP | 2009072756 A | 4/2009 |
| KR | 102470665 B1 | 11/2022 |

\* cited by examiner

METHOD FOR CONTROLLING HOLLOW FIBER NANOFILTRATION MEMBRANE SYSTEM WITH CONTROLLABLE POWER CONSUMPTION

CROSS-REFERENCE TO RELATED APPLICATIONS

This application claims the benefit of priority from Chinese Patent Application No. 202311337367.8, filed on Oct. 17, 2023. The content of the aforementioned application, including any intervening amendments thereto, is incorporated herein by reference in its entirety.

TECHNICAL FIELD

This application relates to water treatment, and more specifically to a method for controlling a hollow fiber nanofiltration membrane system with controllable power consumption.

BACKGROUND

Nanofiltration is a common membrane separation process in water treatment, especially in the feedwater advanced treatment. At present, the nanofiltration membranes are predominated by rolled configuration. However, the rolled nanofiltration membrane requires strict pretreatment processes, and is prone to membrane fouling caused by microbial and organic contamination and residual aluminum fouling, resulting in a high construction and operation cost of the feedwater advanced treatment system. An emerging nanofiltration membrane with a hollow fiber structure can effectively relieve the membrane fouling without high requirement for pretreatment, thereby effectively reducing the overall construction investment and operation costs of the feedwater advanced treatment system. However, the hollow fiber nanofiltration membrane system is sensitive to water temperature, resulting in a larger change in the filtration resistance required to be overcome. Compared with the rolled nanofiltration (with a variation of 30-65%), the hollow fiber nanofiltration has a greater variation (70-120%), thus aggravating the power consumption fluctuation under changes in the pump operation power.

In the actual engineering application, the electricity unit price is not fixed. A day is divided into a peak period, a valley period and a flat period according to the local power demand in different areas. The peak-period electricity price is the highest, sequentially followed by the flat-period electricity price and the valley-period electricity price. Under the constant-flow-rate operation of the hollow fiber nanofiltration membrane system, when the peak period is longer and the average unit price in the peak period and the valley period is higher than that in the flat period, the electricity cost of the hollow fiber nanofiltration membrane system will be relatively high. Moreover, the inlet water temperature of the hollow fiber nanofiltration membrane system will change with the daily temperature. When the water temperature is high, the viscosity of the water is low, and the filtration resistance is low, which facilitates the operation of the system, thereby leading to a high water production rate and a low power consumption. When the water temperature is low, the viscosity of the water is high, and the filtration resistance is high, which is not conducive to the filtration operation of the system, thereby leading to a low water production rate and a high power consumption.

Comprehensively, the constant-power operation limits the water production advantage and energy saving ability of the hollow fiber nanofiltration membrane system, which results in a larger inlet water pressure and increase the operating load and the power consumption, leading to relatively high operating costs.

SUMMARY

An objective of the present disclosure is to provide a method for controlling a hollow fiber nanofiltration membrane system with controllable power consumption to overcome the deficiencies in the prior art.

Technical solutions of the present disclosure are described below.

This application provides a method for controlling a hollow fiber nanofiltration membrane system with controllable power consumption, the hollow fiber nanofiltration membrane system comprising a hollow fiber nanofiltration membrane assembly, a cleaning system, a first monitoring module for monitoring an electricity price and an inlet water temperature in real time, a second monitoring module for monitoring an inlet water pressure change and a permeability change during a filtration process, and a program control system; and the method comprising:

(S1) determining, by the program control system, a present filtration flow rate according to preset working conditions and the electricity price and the inlet water temperature when the hollow fiber nanofiltration membrane assembly is started to perform the filtration process;

(S2) monitoring and recording, by the second monitoring module, the inlet water pressure change and the permeability change during the filtration process; and determining, by the program control system, a flushing mode and a flushing intensity of the cleaning system according to the inlet water pressure change and the permeability change during the filtration process when the filtration process is completed; and (S3) after steps (S1) and (S2) are repeated multiple times; performing enhanced flux maintenance (EFM) cleaning on the hollow fiber nanofiltration membrane system to complete an operation cycle of the hollow fiber nanofiltration membrane system, and resetting step and timing of the program control system to zero.

In some embodiments, in step (S2), an average inlet water pressure of the hollow fiber nanofiltration membrane assembly within an initial 1 min of the filtration process is set as an initial inlet water pressure, expressed as $p_1$;

after the filtration process is completed, an average inlet water pressure of the hollow fiber nanofiltration membrane assembly within 1 min before flushing is set as a final inlet water pressure, expressed as $p_2$; and the inlet water pressure change is expressed by:

$$\Delta p = (p_2 - p_1)/p_1;$$

the flushing mode is determined by the inlet water pressure change amplitude, when $\Delta p<0.2$, the flushing mode is a combination of forward flushing and backwash; when $0.2 \leq \Delta p<0.3$, the flushing mode is a combination of the forward flushing, gas flushing and backwash; when $0.3 \leq \Delta p<0.4$, the flushing mode is a combination of dosing-forward flushing and backwash; and when $\Delta p \geq 0.4$, the flushing mode is a combination of dosing-forward flushing, gas flushing and backwash.

In some embodiments, in step (S2), an average standard permeability of the hollow fiber nanofiltration membrane assembly within the initial 1 min of the filtration process is set as an initial permeability, expressed as $S_1$;

after the filtration process is completed, an average standard permeability of the hollow fiber nanofiltration membrane assembly within the 1 min before the flushing is set as a final permeability, expressed as $S_2$; and the permeability change is expressed by:

$$\Delta S = (S_1 - S_2)/S_1;$$

the flushing intensity is determined by the permeability change; a forward flushing flow rate for a single membrane unit of the hollow fiber nanofiltration membrane assembly is set as $Q_{forward\ flushing}$, a backwash membrane flux is set as $Q_{backwash}$, and a flushing time is set as $T_{flushing}$, respectively expressed by:

$$Q_{forward\ flushing} = 2 + 8\Delta S,\ Q_{forward\ flushing} \leq 4.0\ m^3/h;$$

$$Q_{backwash} = 2 + 40\Delta S,\ Q_{backwash} \leq 30\ lmh;\ \text{and}$$

$$T_{flushing} = 40 + 80\Delta S.$$

In some embodiments, 2.0 m³/h≤$Q_{forward\ flushing}$≤4.0 m³/h; 20 lmh≤$Q_{backwash}$≤30 lmh; and/or 40S≤$T_{flushing}$≤60S.

In some embodiments, in step (S1), the electricity price in a peak period is set as $R_1$, the electricity price in a flat period is set as $R_2$, and the electricity price in a valley period is set as $R_3$; durations of the peak period, the flat period and the valley period are set as $t_1$, $t_2$ and $t_3$, respectively; filtration flow rates in the peak period, the flat period and the valley period are set as $Q_1$, $Q_2$ and $Q_3$, respectively; the inlet water temperature in the peak period, the inlet water temperature in the flat period and the inlet water temperature in the valley period are set as $T_1$, $T_2$ and $T_3$, respectively; and a total water supply flow per day is set as Q;

$Q_2$ represents an average filtration flow rate, which is determined by a corresponding preset average filtration membrane flux, and $Q_1=A*B*Q_2$, wherein A represents a flow coefficient, and B represents a temperature constant; and $Q=Q_1*t_1+Q_2*t_2+Q_3*t_3$;

the average filtration flow rate $Q_2$ is determined according to the corresponding preset average filtration membrane flux;

whether a current moment is in the peak period, the flat period or the valley period is determined according to the electricity price monitored by the first monitoring module, so as to determine a current filtration flow rate as $Q_1$, $Q_2$ or $Q_3$;

whether a current water temperature state is in a first state, a second state or a third state is determined according to a period where the current moment is located and water temperature data monitored by the first monitoring module, wherein a temperature of the first state is greater than a temperature of the second state, and the temperature of the second state is greater than a temperature of the third state; in the first state, the temperature constant B is 0.95, and $Q_1$ is set as 0.95*A*$Q_2$; in the second state, the temperature constant B is 0.90, and $Q_1$ is set as 0.90*A*$Q_2$; and in the third state, the temperature constant B is 0.85, and $Q_1$ is set as 0.85*A*$Q_2$; and $Q_3$ is expressed as:

$$Q_3 = (Q - Q_1*t_1 - Q_2*t_2)/t_3.$$

In some embodiments, a cumulative power consumption in the operation cycle is set as K, and cumulative power consumptions in the peak period, the flat period and the valley period are set as $K_1$, $K_2$ and $K_3$, respectively, such that $K = K_1 + K_2 + K_3$; and an electricity cost for producing a ton of water during the operation cycle is calculated by:

$$F = (K_1*R_1 + K_2*R_2 + K_3*R_3)/Q;$$

and an average water temperature in the operation cycle is set as T, which is automatically monitored and calculated by the program control system; an electricity cost for producing one ton of water with a standard temperature of 20° C. during the operation cycle is set as F', a water temperature coefficient C is calculated by C=1+(20−T)*2.15%, and F'=F/C.

In some embodiments, the operation cycle is repeated N times; and when N is 1, $F_1'=F_1/C_1$; when N is 2, $F_2'=F_2/C_2$; and when N≥3, $F_N'=F_N/C_N$.

In some embodiments, the flow coefficient in an $N^{th}$ operation cycle is represented by $A_N$, and is associated with an adjustment, wherein $A_1$ and $A_2$ default to 1; when a $2^{nd}$ operation cycle is completed and a $3^{rd}$ operation cycle is started, the flow coefficient and the filtration flow in a new operation cycle are adjusted according to the electricity cost of completed operation cycles;

when $F_2' \leq F_1'$, the flow coefficient remains unchanged, and $A_3$ is 1, and at this time, $Q_1=B*Q_2$, $Q_2$ is unchanged, and $Q_3=(Q-Q_1*t_1-Q_2*t_2)/t_3$;

when $F_2'>F_1'$, then the flow coefficient is adjusted by 5%, and $A_3=(1-5\%)*A_2=0.95\ A_2$, and at this time, in the $3^{rd}$ operation cycle, $Q_1=(1-0.05)*A_2*B*Q_2=0.95*B*Q_2$, $Q_2$ is unchanged, and $Q_3=(Q-Q_1*t_1-Q_2*t_2)/t_3$.

In some embodiments, if N≥4:

when $F_{N-1}' \leq F_{N-2}'$, the flow coefficient remains unchanged, and $A_N=A_{N-1}$, and in the $N^{th}$ operation cycle, $Q_1=A_{N-1}*B*Q_2$, $Q_2$ is unchanged, and $Q_3=(Q-Q_1*t_1-Q_2*t_2)/t_3$; and when $F_{N-1}'>F_{N-2}'$, the flow coefficient is adjusted, and $A_N=0.95\ A_{N-1}$, and in the $N^{th}$ operation cycle, $Q_1=0.95\ A_{N-1}*B*Q_2$, $Q_2$ is unchanged, and $Q_3=(Q-Q_1*t_1-Q_2*t_2)/t_3$.

The technical solutions provided herein has the following advantages compared with the prior art.

Regarding the control method provided by the present disclosure, the program control system can carry out real-time analysis according to the real-time electricity price, the inlet water temperature, the cumulative power consumption of the hollow fiber nanofiltration membrane system, and the amount of water produced by the hollow fiber nanofiltration membrane system to automatically adjust the operating condition parameters in response to changes in the electricity price and the inlet water temperature. At the same time, an appropriate flushing mode and flushing intensity are selected to optimize the flushing effect and reduce the inlet water pressure, thereby reducing the operating load of the membrane system and improving the operating status of the membrane system. In this way, the hollow fiber nanofiltration membrane system can be maintained in a good and stable operation state while meeting the water supply demand, so as to reduce the operating cost of the hollow fiber nanofiltration membrane system, especially the electricity consumption.

BRIEF DESCRIPTION OF THE DRAWINGS

The accompanying drawings, which are incorporated into and form a part of the specification, illustrate embodiments of the present disclosure and are used in conjunction with the specification to explain the principles of the present disclosure.

To illustrate the technical solutions in the embodiments or prior art of the present disclosure more clearly, the accompanying drawings required in the description of the embodiments or in the prior art will be briefly described below. Obviously, for one of ordinary skill in the art, other accompanying drawings can be obtained based on these drawings without creative labor.

DETAILED DESCRIPTION OF EMBODIMENTS

Figure 1:
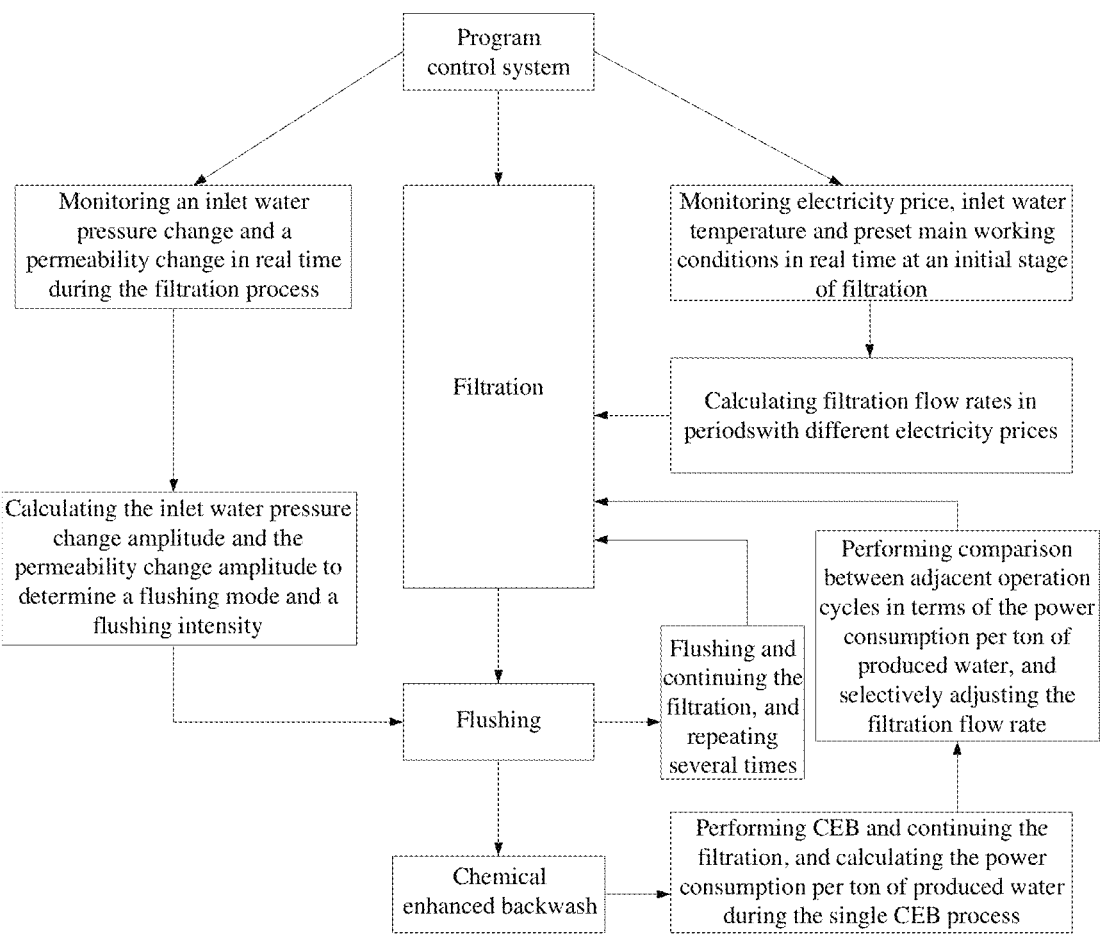
FIG. 1 is a flow chart of a method for controlling a hollow fiber nanofiltration membrane system with controllable power consumption according to an embodiment of the present disclosure.

To enable a clearer understanding of the above purposes, features and advantages of the present disclosure, the technical solutions of the present disclosure will be further described below. It should be noted that embodiments of the present disclosure and features therein may be combined with each other without contradiction.

Many specific details are set forth in the following description to facilitate a full understanding of the present disclosure. However, the present disclosure may also be implemented in other ways different from those described herein. Obviously, the embodiments in the specification are only a part of the embodiments of the present disclosure.

Typical features of the hollow fiber nanofiltration membrane systems are described as follows. (1) It has extremely low drug consumption in the direct operating costs (i.e., electricity consumption and drug consumption). Compared with the drug consumption cost of no less than 20-30% of the rolled nanofiltration system, the drug consumption cost of the hollow fiber nanofiltration membrane system accounts for no more than 10%, and can be as low as 5%. Therefore, the direct operating costs of the hollow fiber nanofiltration membrane system are mainly electricity costs. (2) Affected by the water temperature, changes in the resistance required to overcome for filtration are large. Compared with the change amplitude of 30-65% of the rolled nanofiltration system, the hollow fiber nanofiltration system has a change amplitude of 70-120%, leading to a larger power consumption fluctuation under the changes in the pump operating power. (3) The raw water is used for forward flushing, which has a general flushing effect and a larger water consumption. The hollow fiber nanofiltration membrane system used in engineering applications generally operates in a constant amount, and is not associated with the inlet water temperature and the power consumption. The inlet water pressure is large, and the operating load and the operating power consumption are relatively high, which increases the direct operating costs and fails to give full play to its due advantages.

In the actual engineering application, the electricity unit price is not fixed. A day is divided into a peak period, a valley period and a flat period according to the local power demand in different areas. The peak-period electricity price is the highest, sequentially followed by the flat-period electricity price and the valley-period electricity price. Under the constant-power operation of the hollow fiber nanofiltration membrane system, when the peak period is longer and the average unit price in the peak period and the valley period is higher than that in the flat period, the electricity cost of the hollow fiber nanofiltration membrane system will be relatively high. Moreover, the inlet water temperature of the hollow fiber nanofiltration membrane system will change with the daily temperature. When the water temperature is high, the viscosity of the water is low, and the filtration resistance is low, which facilitates the operation of the system, thereby leading to a high water production rate and a low power consumption. When the water temperature is low, the viscosity of the water is high, and the filtration resistance is high, which is not conducive to the filtration operation of the system, thereby leading to a low water production rate and a high power consumption.

Comprehensively, the constant-power operation limits the water production advantage and energy saving ability of the hollow fiber nanofiltration membrane system, which results in a larger inlet water pressure and increase the operating load and the power consumption, leading to relatively high operating costs.

Based on this, this application provides a hollow fiber nanofiltration membrane system and a control method thereof.

The hollow fiber nanofiltration membrane system includes a hollow fiber nanofiltration membrane assembly, a cleaning system, a first monitoring module for monitoring an electricity price and an inlet water temperature in real time, a second monitoring module for monitoring an inlet water pressure change and a permeability change during a filtration process, and a program control system. The hollow fiber nanofiltration membrane assembly is used for solid-liquid separation of raw water, retention of pollutants, and output of clean water. The cleaning system is connected to the hollow fiber nanofiltration membrane assembly to provide physical and chemical cleaning for the hollow fiber nanofiltration membrane assembly. The program control system is connected to the first monitoring module, the second monitoring module, the hollow fiber nanofiltration membrane assembly and the cleaning system. The program control system is used to determine the filtration flow rate of the hollow fiber nanofiltration membrane assembly based on the preset working conditions and the electricity price and inlet water temperature obtained from the first monitoring module. The program control system is used to determine the filtration flow rate of the hollow fiber nanofiltration membrane group based on a preset working condition and the unit price of electricity and the influent water temperature obtained from the first monitoring module. Furthermore, the program control system is also used to determine a flushing mode and a flushing intensity for the cleaning system according to the inlet water pressure change amplitude and the permeability change amplitude during the filtration obtained from the second monitoring module.

The program control system can carry out analysis in real time according to the real-time electricity price, the inlet water temperature, the cumulative power consumption of the hollow fiber nanofiltration membrane system, and the amount of water produced by the hollow fiber nanofiltration membrane system to automatically adjust the operating condition parameters when facing changes in the electricity price and the inlet water temperature. At the same time, an appropriate flushing mode and a flushing intensity are selected to optimize the flushing effect and reduce the inlet water pressure, thereby reducing the operating loads of the membrane system and improving the operating status of the membrane system. In this way, the good and stable operation of the hollow fiber nanofiltration membrane system can be maintained while guaranteeing the demand for water supply, so as to reduce the operating cost of the hollow fiber nanofiltration membrane system, especially the cost of electricity consumption.

In this disclosure, the produced water of the hollow fiber nanofiltration membrane assembly can be used as the flushing water. In this embodiment, the use of the produced water and the selection of the appropriate flushing mode and flushing intensity can optimize the flushing effect, which can reduce the inlet water pressure, reduce the operating load of the hollow fiber nanofiltration membrane system, and improve the operating state of the hollow fiber nanofiltration membrane system. In this case, the water supply demand can be ensured while maintaining a good and stable operation of the hollow fiber nanofiltration membrane system, thereby reducing the operating cost, especially the cost of electricity consumption, of the hollow fiber nanofiltration membrane system.

In some embodiments, the system further includes a dosing system. The dosing system is connected to the cleaning system for providing the cleaning system with an acid solution, a base solution or a biocide agent.

The first monitoring module and the second monitoring module are both connected to a control system.

The program control system includes a system operation process state monitoring module, a dosage monitoring module of the dosing system, an on-line water-quality monitoring module and a control module. The control module is used to receive feedback information from the first monitoring module, the second monitoring module, the system operation process state monitoring module and the dosing system. The control module controls the operation of the water supply system, the water production system, the cleaning system, and the dosing system according to the feedback information. The control module includes a controller. The online water-quality monitoring module is used to monitor conductivity, temperature, pH, desalination rate, etc. The dosage monitoring module of the dosing system is used to monitor the dosage of the acid solution, the base solution or the biocide agent.

When the hollow fiber nanofiltration membrane system is running, a complete running process is filtration-flushing-(maintenance chemical cleaning) (CEB), and the duration of the complete running process is defaulted to be 24 h.

Firstly, when the membrane system is turned on for filtration, the program control system automatically selects and sets a flow rate of water produced by filtration according to the electricity price, the water temperature and the preset main working conditions in the current period monitored by the first monitoring module.

Then, during the filtration of the hollow fiber nanofiltration membrane system, the second monitoring module monitors the inlet water pressure and permeability changes in real time, and transmit the monitored information to the control system. When the filtration is almost finished and before flushing, the program control system provides the flushing mode and flushing intensity according to the calculation results when the filtration is completed.

After the new operation process is started, the program control system will analyze the cost of electricity consumption for producing one ton of water according to the existing operation process, and make further correlation and selective adjustments to the filtration flow rate in the new operation process, so as to keep the cost of electricity consumption for producing one ton of water at a lower level in the whole operation process.

Among them, the preset main working conditions are as follows. An average filtration membrane flux is 20-30 lmh, corresponding to the average filtration flow rate. The flushing mode is a combination of forward flushing and backwash, a combination of forward flushing, gas flushing and backwash, a combination of dosing forward flushing and backwash, or a combination of dosing forward flushing, gas flushing and backwash. The flushing intensity is as follows: the forward flushing flow rate for a single membrane is 2.0-4.0 $m^3/h$, the backwash membrane flux is 20-30 lmh, and the flushing lasts for 40-60 s.

Preferably, the average filter membrane flux is 25 lmh.

Preferably, the flushing mode is the combination of forward flushing, gas flushing and backwash. The flushing intensity is as follows: the forward flushing flow rate for a single membrane is 3.0 $m^3/h$, the backwash membrane flux is 25 lmh, and the flushing time is 50 s.

Through the above self-matching and self-adjustments by the program control system, an intelligent operation correlation control method according to the electricity price, the influent water temperature and the operating conditions is formed, so that when the hollow fiber nanofiltration membrane system operates at a lower operating load, the system water supply demand can be satisfied. At the same time, the produced water is used for flushing, which improves the flushing effect, thereby reducing the operating costs of the membrane system. Compared with the constant volume operation control method, the power consumption cost of the system provided herein can be reduced by about 13-19%.

Since the electricity price is different among a peak period, the electricity price in a peak period is set as $R_1$, the electricity price in a flat period is set as $R_2$, and the electricity price in a valley period is set as $R_3$; durations of the peak period, the flat period and the valley period are set as $t_1$, $t_2$ and $t_3$, respectively; filtration flow rates in the peak period, the flat period and the valley period are set as $Q_1$, $Q_2$ and $Q_3$, respectively; the inlet water temperature in the peak period, the inlet water temperature in the flat period and the inlet water temperature in the valley period are set as $T_1$, $T_2$ and $T_3$, respectively; and a total water supply flow per day is set as Q.

$Q_2$ represents an average filtration flow rate, which is determined by a corresponding preset average filtration membrane flux, and $Q_1 = A*B*Q_2$, where A represents a flow coefficient, and B represents a temperature constant; and $Q = Q_1*t_1 + Q_2*t_2 + Q_3*t_3$;

When the hollow fiber nanofiltration system is in operation, the complete operation process is filtration-flushing-CEB, and a duration of the complete operation process is defaulted to be 24 h.

Figure 2:
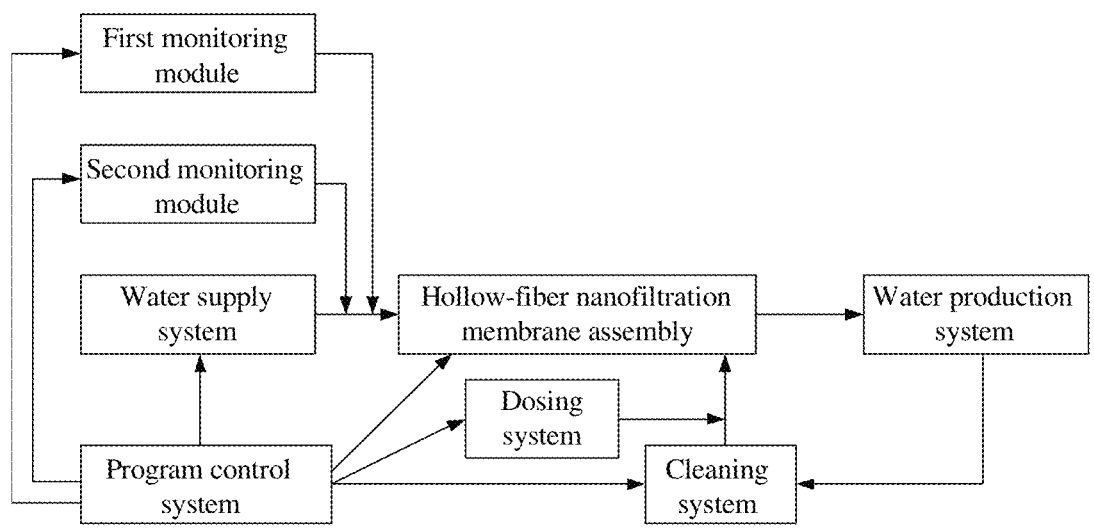
FIG. 2 is a schematic diagram of the hollow fiber nanofiltration membrane system according to an embodiment of the present disclosure.

Referring to FIGS. 1 and 2, a method for controlling a hollow fiber nanofiltration membrane system with controllable power consumption is provided. The hollow fiber nanofiltration membrane system includes a hollow fiber nanofiltration membrane assembly, a cleaning system, a first monitoring module for monitoring an electricity price and an inlet water temperature, a second monitoring module for monitoring an inlet water pressure change amplitude and a permeability change amplitude during filtration, and a program control system. The method includes the following steps.

(S1) A filtration flow rate is determined by the program control system according to preset working conditions and the electricity price and the inlet water temperature when the hollow fiber nanofiltration membrane assembly is started to perform the filtration process.

(S2) The inlet water pressure change and the permeability change are monitored and recorded by the second monitoring module during the filtration process. A flushing mode and a flushing intensity of the cleaning system are determined by the program control system according to the inlet water pressure change and the permeability change during the filtration process when the filtration process is completed.

(S3) After steps (S1) and (S2) are repeated multiple times, the enhanced flux maintenance (EFM) cleaning is performed on the hollow fiber nanofiltration membrane system for maintenance to complete an operation cycle of the hollow fiber nanofiltration membrane system, and steps and timing of the program control system are reset to zero.

Based on the self-matching and self-adjusting correlation control of the programmed control system, it can automatically calculates and analyzes the filtration flow rate, the flushing mode and the flushing intensity while simultaneously monitoring the electricity price, the inlet water temperature and operation conditions in real time, so as to meet the water supply demand of the system, reduce the inlet water pressure, lower the operating load of the system, optimize the flushing effect of the system, and improve the operating status of the hollow fiber nanofiltration system, thus reducing the operation cost of the hollow fiber nanofiltration system. While improving the operational stability of the hollow fiber nanofiltration membrane system, it also realizes the energy saving and consumption reduction of the hollow fiber nanofiltration membrane system. the program control system can carry out analysis in real time according to the real-time electricity price, the inlet water temperature, the cumulative power consumption of the hollow fiber nanofiltration membrane system, and the amount of water produced by the hollow fiber nanofiltration membrane system to automatically adjust the operating condition parameters when facing changes in the electricity price and the inlet water temperature. At the same time, an appropriate flushing mode and a flushing intensity are selected to optimize the flushing effect and reduce the inlet water pressure, thereby reducing the operating loads of the membrane system and improving the operating status of the membrane system. In this way, the good and stable operation of the hollow fiber nanofiltration membrane system can be maintained while guaranteeing the demand for water supply, so as to reduce the operating cost of the hollow fiber nanofiltration membrane system, especially the cost of electricity consumption.

In some embodiments, in step (S2), an average inlet water pressure of the hollow fiber nanofiltration membrane assembly within an initial 1 min of the filtration process is set as an initial inlet water pressure, expressed as $p_1$. After the filtration process is completed, an average inlet water pressure of the hollow fiber nanofiltration membrane assembly within 1 min before flushing is set as a final inlet water pressure, expressed as $p_2$. The inlet water pressure change is expressed by:

$$\Delta p = (p_2 - p_1)/p_1.$$

The flushing mode is determined by the inlet water pressure change, when $\Delta p<0.2$, the flushing mode is a combination of forward flushing and backwash. When $0.2 \leq \Delta p < 0.3$, the flushing mode is a combination of forward flushing, gas flushing and backwash. When $0.3 \leq \Delta p < 0.4$, the flushing mode is a combination of dosing-forward flushing and the backwash. When $\Delta p > 0.4$, the flushing mode is a combination of the dosing forward flushing, the gas flushing and the backwash.

In some embodiments, in step (S2), an average standard permeability of the hollow fiber nanofiltration membrane assembly within the initial 1 min of the filtration process is set as an initial permeability, expressed as $S_1$.

An average standard permeability of the hollow fiber nanofiltration membrane assembly within the 1 min before the flushing is set as a final permeability, expressed as $S_2$; and the permeability change is expressed by:

$$\Delta S = (S_1 - S_2)/S_1.$$

The flushing intensity is determined by the permeability change; a forward flushing flow rate for a single membrane of the hollow fiber nanofiltration membrane assembly is set as $Q_{forward\ flushing}$, a backwash membrane flux is set as $Q_{backwash}$, and a flushing time is set as $T_{flushing}$, respectively expressed by:

$$Q_{forward\ flushing} = 2 + 8\Delta S,\ Q_{forward\ flushing} \leq 4.0\ m^3/h;$$

$$Q_{backwash} = 2 + 40\Delta S,\ Q_{backwash} \leq 30\ lmh;\ and$$

$$T_{flushing} = 40 + 80\Delta S.$$

In some embodiments, $2.0\ m^3/h \leq Q_{forward\ flushing} \leq 4.0\ m^3/h$;

20 lmh $\leq Q_{backwash} \leq$ 30 lmh; and/or

40 S $\leq T_{flushing} \leq$ 60 s.

In some embodiments, in step (S1), the electricity price in a peak period is set as $R_1$, the electricity price in a flat period is set as $R_2$, and the electricity price in a valley period is set as $R_3$; durations of the peak period, the flat period and the valley period are set as $t_1$, $t_2$ and $t_3$, respectively; filtration flow rates in the peak period, the flat period and the valley period are set as $Q_1$, $Q_2$ and $Q_3$, respectively; the inlet water temperature in the peak period, the inlet water temperature in the flat period and the inlet water temperature in the valley period are set as $T_1$, $T_2$ and $T_3$, respectively; and a total water supply flow per day is set as Q.

$Q_2$ represents an average filtration flow rate, which is determined by a corresponding preset average filtration membrane flux, and $Q_1 = A*B*Q_2$, where A represents a flow coefficient, and B represents a temperature constant; and $Q = Q_1*t_1 + Q_2*t_2 + Q_3*t_3$.

The average filtration flow rate $Q_2$ is determined according to the corresponding preset average filtration membrane flux.

Whether a current moment is in the peak period, the flat period or the valley period is determined according to the electricity price monitored by the first monitoring module, so as to determine a current filtration flow rate as $Q_1$, $Q_2$ or $Q_3$.

Whether a current water temperature state is in a first state, a second state or a third state is determined according to a period where the current moment is located and water temperature data monitored by the first monitoring module, where a temperature of the first state is greater than a temperature of the second state, and the temperature of the second state is greater than a temperature of the third state; in the first state, the temperature constant B is 0.95, and $Q_1$ is set as $0.95*A*Q_2$; in the second state, the temperature constant B is 0.90, and $Q_1$ is set as $0.90*A*Q_2$; and in the third state, the temperature constant B is 0.85, and $Q_1$ is set as $0.85*A*Q_2$; and $Q_3$ is expressed as:

$$Q_3 = (Q - Q_1 * t_1 - Q_2 * t_2)/t_3.$$

In some embodiments, a cumulative power consumption in the operation cycle is set as K, and cumulative power consumptions in the peak period, the flat period and the valley period are set as $K_1$, $K_2$ and $K_3$, such that $K=K_1+K_2+K_3$.

An electricity cost for producing a ton of water during the operation cycle is calculated by:

$$F = (K_1 * R_1 + K_2 * R_2 + K_3 * R_3)/Q.$$

An average water temperature in the operation cycle is set as T, which is automatically monitored and calculated by the program control system; an electricity cost for producing one ton of water with a standard water temperature of 20° C. during the operation cycle is set as F', a water temperature coefficient C is calculated by $C=1+(20-T)*2.15\%$, and $F_N'=F/C$.

In some embodiments, the number of the operation cycle is N, such that:
when N is 1, $F_1'=F_1/C_1$;
when N is 2, $F_2'=F_2/C_2$; and
when N≥3, $F_N'=F_N/C_N$.

In some embodiments, the flow coefficient in an $N^{th}$ operation cycle is represented by $A_N$, and is associated with an adjustment, wherein $A_1$ and $A_2$ default to 1; when a $2^{nd}$ operation cycle is completed and a $3^{rd}$ operation cycle is started, the flow coefficient and the filtration flow in a new operation cycle are adjusted according to the electricity cost of completed operation cycles (namely, $F_2'$ and $F_1'$).

When $F_2'≤F_1'$, the flow coefficient remains unchanged, and $A_3$ is 1, and at this time, $Q_1=B*Q_2$, $Q_2$ is unchanged, and $Q_3=(Q-Q_1*t_1-Q_2*t_2)/t_3$.

When $F_2'>F_1'$, then the flow coefficient is adjusted by 5%, and $A_3=(1-5\%)*A_2=0.95 A_2$, and at this time, in the $3^{rd}$ operation cycle, $Q_1=(1-0.05)*A_2*B*Q_2=0.95*B*Q_2$, $Q_2$ is unchanged, and $Q_3=(Q-Q_1*t_1-Q_2*t_2)/t_3$.

In some embodiments, if N>4: when $F_{N-1}'≤F_{N-2}'$, the flow coefficient remains unchanged, and $A_N=A_{N-1}$, and in the $N^{th}$ operation cycle, $Q_1=A_{N-1}*B*Q_2$, $Q_2$ is unchanged, and $Q_3=(Q-Q_1*t_1-Q_2*t_2)/t_3$; and when $F_{N-1}'>F_{N-2}'$, the flow coefficient is adjusted, and $A_N=0.95 A_{N-1}$, and in the $N^{th}$ operation cycle, $Q_1=0.95 A_{N-1}*B*Q_2$, $Q_2$ is unchanged, and $Q_3=(Q-Q_1*t_1-Q_2*t_2)/t_3$.

The present disclosure is described below with reference to specific embodiments.

For example, for a project site, electricity prices in the peak period, the flat period and the valley period are 1.05 yuan/kwh, 0.70 yuan/kwh and 0.35 yuan kwh, respectively. Durations of the peak period, the flat period and the valley period are 8 h, 7 h and 9 h, respectively. The total flow Q of water supply per day is 24000 m³. The average filtration membrane flux is set as 25 lmh, and the corresponding average filtration flow $Q_2$ given by the system is 1000 m³/h.

The peak period during which the system initially operate is located in the morning, and the initial water temperature is detected to be in the medium-temperature state at this time, then the filtration flow rate $Q_1$ in the peak period is $0.90 Q_2=900$ m³/h, and the filtration flow rate $Q_3$ in the valley period is calculated by:

$$Q_3 = (Q - Q_1 * t_1 - Q_2 * t_2)/t_3 = 1088.9 \text{ m}^3/\text{h}.$$

At the initial operation of the system, the inlet water pressure is 3.0 bar, the permeability is 7.3 lmh/bar. At the end of the first filtration cycle, the inlet water pressure is 3.6 bar, the permeability is 6.9 lmh/bar, the inlet pressure change amplitude is $(3.6-3.0)/3.0=0.20<0.25$, and the permeability change amplitude is $(7.3-6.9)/7.3=5.48\%$. The flushing mode is the combination of forward flushing and backwash. The flushing intensity is as follows. The forward flushing flow rate is $2+8×5.48\%=2.44$ m³/h, the backwash membrane flux is $20+40*5.48\%=22.19$ lmh, and the flushing time is $40+80*5.48\%=44.38$, rounded to 44 s.

After that, the system continues to run, in the $1^{st}$ operating process cycle, cumulative power consumptions in the peak period, the flat period, and the valley period are 3709 kw, 3156 kw and 5680 kw, respectively, then the electricity cost for producing one ton of water is $F=(3709*1.05+3156*0.70+5680*0.35)/24,000=0.337$ yuan. The average water temperature during the operation is 18.5° C., then the water temperature coefficient is $C=1+(20-18.5)*2.15\%=1.032$, and the electricity cost for producing one ton of water at the standard water temperature of 20° C. is $F'=F/C=0.337/1.032=0.327$ yuan.

Thereafter, the system continues to operate, in the $2^{nd}$ operation process cycle, the electricity cost for producing one ton of water at the standard water temperature of 20° C. is 0.316 yuan<0.327 yuan. In the $3^{rd}$ operation process cycle, the filtration flow rate is not fine-tuned, and the electricity cost for producing one ton of water at the standard water temperature of 20° C. is 0.321 yuan>0.316 yuan. The filtration flow rate in the $4^{th}$ operation process is fine-tuned, where $Q_1$ is adjusted to 855 m³/h, and $Q_3$ is adjusted to 1093.9 m³/h, then the electricity cost for producing one ton of water at the standard water temperature of 20° C. is 0.319 yuan<0.321 yuan, and thereafter the system continues to run.

The system runs for 1 month at a stable inlet pressure of 3.0-4.2 bar, and the average electricity cost for producing one ton of water at the standard water temperature of 20° C. is 0.323 yuan. In the same period, the inlet water pressure under constant volume operation is 3.0-4.8 bar, and the average electricity cost for producing one ton of water at the standard water temperature of 20° C. is 0.379 yuan. Compared with the constant volume operation, by using the intelligent control operation, the inlet water pressure is reduced by 0-0.6 bar, and the electricity consumption cost is reduced by 14.78%.

It should be noted that in this application, relational terms such as "first" and "second" are merely only to distinguish one entity or operation from another, and do not necessarily require or imply the existence of any actual relationship or order between these entities or operations. Furthermore, the terms "including", "comprising", or any other variant thereof, are intended to cover non-exclusive inclusion, such that a process, method, article or apparatus including a set of elements includes not only those elements, but also other elements not expressly listed, or other elements that are inherent to such process, method, article or apparatus. Without further limitations, the element defined by the wording "including a . . . " does not exclude the existence of another identical element in the process, method, article, or apparatus in which the element is included.

The above are only specific embodiments of the present disclosure to enable one of ordinary skill in the art to understand or realize the present disclosure. Various modifications to these embodiments will be apparent to one of ordinary skill in the art, The general principles defined herein may be realized in other embodiments without departing from the spirit or scope of the present disclosure. Accordingly, the present disclosure will not be limited to these embodiments herein, but will be subject to the broadest scope consistent with the principles and novel features disclosed herein.

What is claimed is:

1. A method for controlling a hollow fiber nanofiltration membrane system with controllable power consumption, the hollow fiber nanofiltration membrane system comprising a hollow fiber nanofiltration membrane assembly, a cleaning system, a first monitoring module for monitoring an electricity price and an inlet water temperature in real time, a second monitoring module for monitoring an inlet water pressure change and a permeability change during a filtration process, and a program control system; and the method comprising:
   (S1) determining, by the program control system, a filtration flow rate according to preset working conditions and the electricity price and the inlet water temperature; and starting the filtration process by the hollow fiber nanofiltration membrane assembly;
   (S2) monitoring and recording, by the second monitoring module, the inlet water pressure change and the permeability change during the filtration process; completing the filtration process; determining, by the program control system, a flushing mode of the cleaning system according to the inlet water pressure change; and determining, by the program control system, a flushing intensity of the cleaning system according to the permeability change during the filtration process when the filtration process is completed; and
   (S3) repeating steps (S1) and (S2), performing enhanced flux maintenance (EFM) cleaning on the hollow fiber nanofiltration membrane system according to the flushing mode and the flushing intensity to complete an operation cycle of the hollow fiber nanofiltration membrane system, and resetting step and timing of the program control system to zero;
   wherein in step (S2), setting an average inlet water pressure of the hollow fiber nanofiltration membrane assembly within an initial 1 min of the filtration process as an initial inlet water pressure $p_1$;
   completing the filtration process, and setting an average inlet water pressure of the hollow fiber nanofiltration membrane assembly within 1 min before flushing as a final inlet water pressure, $p_2$; wherein the inlet water pressure change is expressed by:

$$\Delta p = (p_2 - p_1)/p_1;$$

wherein when $\Delta p < 0.2$, the flushing mode is a combination of forward flushing and backwash; when $0.2 \leq \Delta p < 0.3$, the flushing mode is a combination of forward flushing, gas flushing and backwash; when $0.3 \leq \Delta p < 0.4$, the flushing mode is a combination of dosing-forward flushing and backwash; and when $\Delta p \geq 0.4$, the flushing mode is a combination of dosing-forward flushing, gas flushing and backwash;
   in step (S2), setting an average standard permeability of the hollow fiber nanofiltration membrane assembly within the initial 1 min of the filtration process as an initial permeability $S_1$;
   completing the filtration process, then setting an average standard permeability of the hollow fiber nanofiltration membrane assembly within the 1 min before the flushing as a final permeability $S_2$; wherein the permeability change is expressed by:

$$\Delta S = (S_1 - S_2)/S_1;$$

setting a forward flushing flow rate for a single membrane of the hollow fiber nanofiltration membrane assembly as $Q_{forward\,flushing}$, setting a backwash membrane flux of the single membrane as $Q_{backwash}$, and setting a flushing time of the single membrane as $T_{flushing}$, wherein $Q_{forward\,flushing}$, $Q_{backwash}$ and $T_{flushing}$ are respectively expressed by:

$$Q_{forward\,flushing} = 2 + 8\Delta S, Q_{forward\,flushing} \leq 4.0 \text{ m}^3/\text{h};$$

$$Q_{backwash} = 2 + 40\Delta S, Q_{backwash} \leq 30 \text{ lmh; and}$$

$$T_{flushing} = 40 + 80\Delta S;$$

in step (S1), setting the electricity price in a peak period as $R_1$, setting the electricity price in a flat period as $R_2$, and setting the electricity price in a valley period as $R_3$; setting durations of the peak period, the flat period and the valley period as $t_1$, $t_2$ and $t_3$, respectively; setting filtration flow rates in the peak period, the flat period and the valley period as $Q_1$, $Q_2$ and $Q_3$, respectively; setting the inlet water temperature in the peak period, the inlet water temperature in the flat period and the inlet water temperature in the valley period as $T_1$, $T_2$ and $T_3$, respectively; and setting a total water supply flow per day as Q;
   wherein $Q_2$ represents an average filtration flow rate, which is determined by a corresponding preset average filtration membrane flux, and $Q_1$ is expressed by $Q_1 = A*B*Q_2$, wherein A represents a flow coefficient, and B represents a temperature constant; and Q is expressed by $Q = Q_1*t_1 + Q_2*t_2 + Q_3*t_3$;
   determining the average filtration flow rate $Q_2$ according to the corresponding preset average filtration membrane flux;
   determining, by the first monitoring module, whether a current moment is in the peak period, the flat period or the valley period according to the electricity price monitored and determining a current filtration flow rate as $Q_1$, $Q_2$ or $Q_3$ based on a current electricity price;

determining, by the first monitoring module, whether a current water temperature state is in a first state, a second state or a third state according to a period where the current moment is located and water temperature data, wherein a temperature of the first state is greater than a temperature of the second state, and the temperature of the second state is greater than a temperature of the third state; and setting the temperature constant B and the flow rate $Q_1$ based on a current temperature state; in the first state, the temperature constant B is 0.95, and $Q_1$ is expressed as $0.95*A*Q_2$; in the second state, the temperature constant B is 0.90, and $Q_1$ is expressed as $0.90*A*Q_2$; and in the third state, the temperature constant B is 0.85, and $Q_1$ is expressed as $0.85*A*Q_2$; wherein $Q_3$ is expressed as:

$$Q_3 = (Q - Q_1 * t_1 - Q_2 * t_2)/t_3.$$

2. The method of claim 1, wherein:

$2.0\ m^3/h \leq Q_{forward\ flushing} \leq 4.0\ m^3/h;$
$20\ lmh \leq Q_{backwash} \leq 30\ lmh;$ and/or
$40\ s \leq T_{flushing} \leq 60\ s.$ 3. The method of claim 1, further comprising: setting a cumulative power consumption in the operation cycle as K, and setting cumulative power consumptions in the peak period, the flat period and the valley period as $K_1$, $K_2$ and $K_3$, respectively, wherein $K=K_1+K_2+K_3$;

calculating an electricity cost F for producing a ton of water during the operation cycle by:

$$F = (K_1 * R_1 + K_2 * R_2 + K_3 * R_3)/Q;$$

setting an average water temperature in the operation cycle as T, and automatically monitoring and calculating, by the program control system, the average water temperature; setting an electricity cost for producing one ton of water with a standard temperature of 20° C. during the operation cycle as F', and calculating a water temperature coefficient C by $C=1+(20-T)*2.15\%$, and $F'=F/C$;

wherein the number of the operation cycle is N, such that when N is 1, $F_1'=F_1/C_1$;

when N is 2, $F_2'=F_2/C_2$; and when $N \geq 3$, $F_N'=F_N/C_N$;

the flow coefficient in an Nth operation cycle is represented by $A_N$, and is associated with an adjustment, wherein $A_1$ and $A_2$ default to 1; when a $2^{nd}$ operation cycle is completed and a $3^{rd}$ operation cycle is started, the flow coefficient and the filtration flow in a new operation cycle are adjusted according to $F_2'$ and $F_1'$:

when $F_2' \leq F_1'$, the flow coefficient remains unchanged, and $A_3$ is 1, and at this time, $Q_1=B*Q_2$, $Q_2$ is unchanged, and $Q_3=(Q-Q_1*t_1-Q_2*t_2)/t_3$; and when $F_2' \leq F_1'$, the flow coefficient is adjusted by 5%, and $A_3=(1-5\%)*A_2=0.95A_2$, and at this time, in the $3^{rd}$ operation cycle, $Q_1=(1-0.05)*A_2*B*Q_2=0.95*B*Q_2$, $Q_2$ is unchanged, and $Q_3=(Q-Q_1*t_1-Q_2*t_2)/t_3$.

4. The method of claim 3, wherein if $N \geq 4$:

when $F_{N-1}' \leq F_{N-2}'$, the flow coefficient remains unchanged, and $A_N=A_{N-1}$, and in the $N^{th}$ operation cycle, $Q_1=A_{N-1}*B*Q_2$, $Q_2$ is unchanged, and $Q_3=(Q-Q_1*t_1-Q_2*t_2)/t_3$; and when $F_{N-1}'>F_{N-2}'$, the flow coefficient is adjusted, and $A_N=0.95\ A_{N-1}$, and in the $N^{th}$ operation cycle, $Q_1=0.95A_{N-1}*B*Q_2$, $Q_2$ is unchanged, and $Q_3=(Q-Q_1*t_1-Q_2*t_2)/t_3$.

* * * * *